United States Patent
Richer et al.

(10) Patent No.: US 10,832,595 B2
(45) Date of Patent: Nov. 10, 2020

(54) MEDICO-SURGICAL SIMULATOR AND MEDICO-SURGICAL SIMULATION METHOD

(71) Applicants: CENTRE NATIONAL DE LA RECHERCHE SCIENTIFIQUE, Paris (FR); UNIVERSITE DE POITIERS, Poitiers (FR); CENTRE HOSPITALIER UNIVERSITAIRE DE POITIERS, Poitiers (FR); INSERM—INSTITUT NATIONAL DE LA SANTE ET DE LA RECHERCHE MEDICALE, Paris (FR)

(72) Inventors: Jean-Pierre Richer, Lusignan (FR); Jean-Pierre Faure, Mignaloux-Beauvoir (FR); Denis Oriot, Poitiers (FR); Cyril Breque, Poitiers (FR); Pierre Olivier Delpech, Poitiers (FR); Daniel-Aïham Ghazali, Mignaloux-Beauvoir (FR)

(73) Assignees: CENTRE NATIONAL DE LA RECHERCHE SCIENTIFIQUE, Paris (FR); UNIVERSITE DE POITIERS, Poitiers (FR); CENTRE HOSPITALIER UNIVERSITAIRE DE POITIERS, Poitiers (FR); INSERM—INSTITUT NATIONAL DE LA SANTE ET DE LA RECHERCHE MEDICALE, Paris (FR)

( * ) Notice: Subject to any disclaimer, the term of this patent is extended or adjusted under 35 U.S.C. 154(b) by 293 days.

(21) Appl. No.: 15/769,587

(22) PCT Filed: Oct. 26, 2016

(86) PCT No.: PCT/EP2016/075819
§ 371 (c)(1),
(2) Date: Apr. 19, 2018

(87) PCT Pub. No.: WO2017/076717
PCT Pub. Date: May 11, 2017

(65) Prior Publication Data
US 2018/0315346 A1 Nov. 1, 2018

(30) Foreign Application Priority Data
Nov. 2, 2015 (FR) .................................... 15 60488

(51) Int. Cl.
*G09B 23/30* (2006.01)
*G09B 23/28* (2006.01)

(52) U.S. Cl.
CPC ......... *G09B 23/306* (2013.01); *G09B 23/288* (2013.01); *G09B 23/303* (2013.01)

(58) Field of Classification Search
CPC ... G09B 23/306; G09B 23/288; G09B 23/303
(Continued)

(56) References Cited

U.S. PATENT DOCUMENTS 6,824,389 B1 11/2004 Garrett, Jr. et al.
2003/0045803 A1* 3/2003 Acharya ................ A61B 6/032
600/508

(Continued)

FOREIGN PATENT DOCUMENTS

WO 2008/039979 A2 4/2008
WO 2012/058533 A2 5/2012

OTHER PUBLICATIONS

International Search Report, dated Dec. 6, 2016, from corresponding Application No. PCT/EP2016/075819.

(Continued)

*Primary Examiner* — Michael C Grant
(74) *Attorney, Agent, or Firm* — Nixon & Vander Hye

(57) ABSTRACT

Disclosed is a medico-surgical simulator and to a corresponding method. The medico-surgical simulator includes a vascularization device and/or a ventilation device, as well as a regulation device. The medico-surgical simulator is arranged so as to be connected to a cadaver and to vascularize an arterial system of the cadaver via the vascularization device and/or to ventilate a respiratory system of the cadaver via the ventilation device. The regulation device controls the vascularization and ventilation devices in such a way as to simulate cardiorespiratory functions for providing surgical training carried out on the cadaver with a very high degree of realism.

18 Claims, 2 Drawing Sheets

Figure 1:
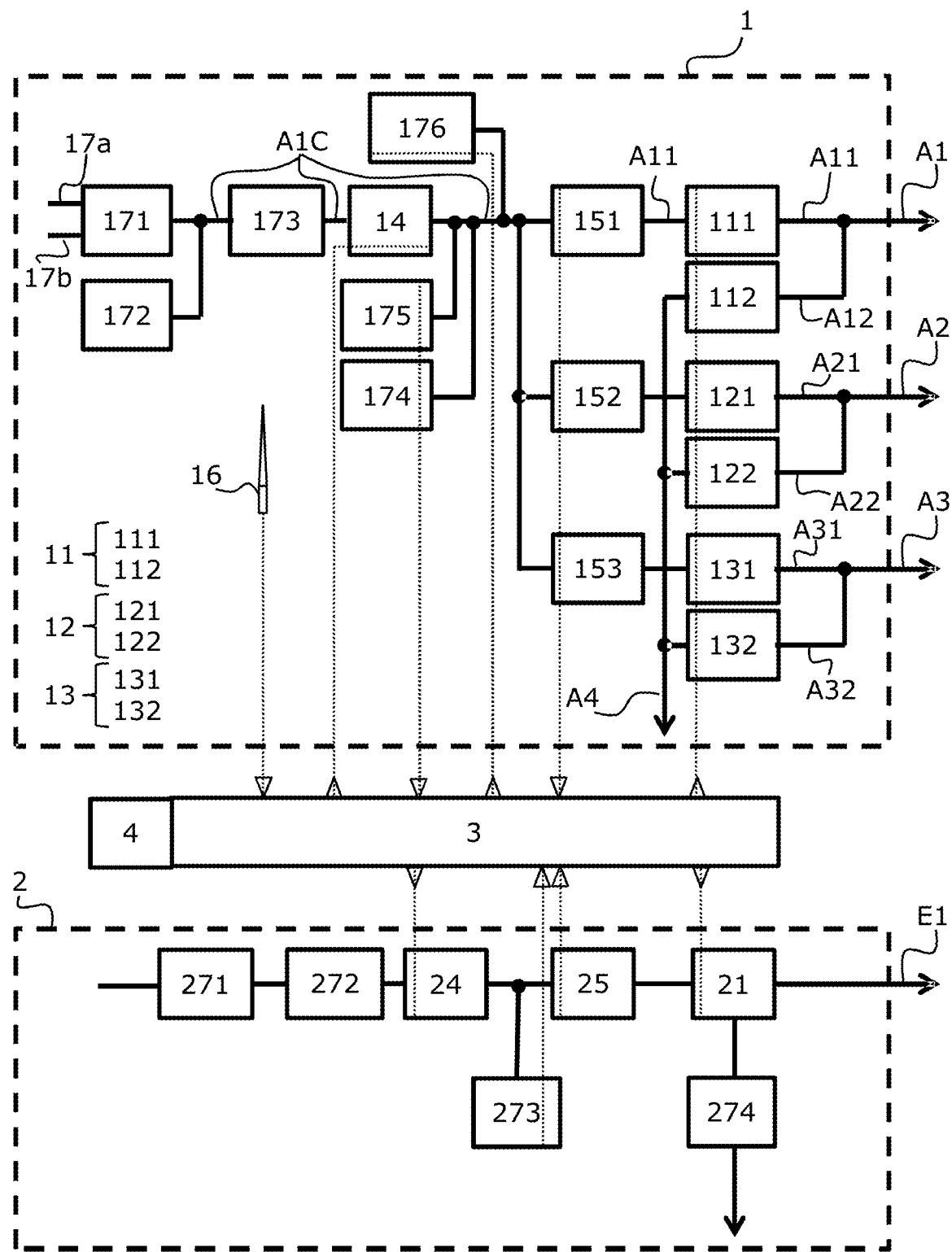

(58) Field of Classification Search
USPC .......................................................... 434/268
See application file for complete search history.

(56) References Cited

U.S. PATENT DOCUMENTS

| | | | | | |
|---|---|---|---|---|---|
| 2003/0186203 | A1* | 10/2003 | Aboud | .................. | G09B 23/303 |
| | | | | | 434/262 |
| 2004/0033477 | A1* | 2/2004 | Ramphal | .............. | G09B 23/306 |
| | | | | | 434/272 |
| 2014/0370490 | A1* | 12/2014 | Iaizzo | .................. | A01N 1/0247 |
| | | | | | 435/1.2 |
| 2016/0140878 | A1* | 5/2016 | Fernandez | ............... | A01N 1/00 |
| | | | | | 434/268 |
| 2017/0116887 | A1* | 4/2017 | McHale | ................ | G09B 23/303 |
| 2017/0169734 | A1* | 6/2017 | Wen | ........................ | G09B 23/32 |
| 2017/0368280 | A1* | 12/2017 | Dermel | ............. | A61M 16/0051 |
| 2018/0315346 | A1* | 11/2018 | Richer | .................. | G09B 23/306 |
| 2019/0147768 | A1* | 5/2019 | Fernandez | ........... | G09B 23/303 |
| | | | | | 434/268 |
| 2019/0266922 | A1* | 8/2019 | Lemieux | .............. | G09B 23/306 |

OTHER PUBLICATIONS

French Preliminary Search Report, dated Mar. 7, 2018, from corresponding Application No. FR 1560488.
French Search Report, dated Mar. 7, 2018, from corresponding Application No. FR 1560488.
Aboud, Emad et al., "Novel Simulation for Training Trauma Surgeons," The Journal of Trauma Injury, Infection, and Critical Care , vol. 71, No. 6, Dec. 2011, pp. 1484-1490.
Written Opinion, dated Dec. 6, 2016, from corresponding Application No. PCT/EP2016/075819, with English Translation provided.

* cited by examiner

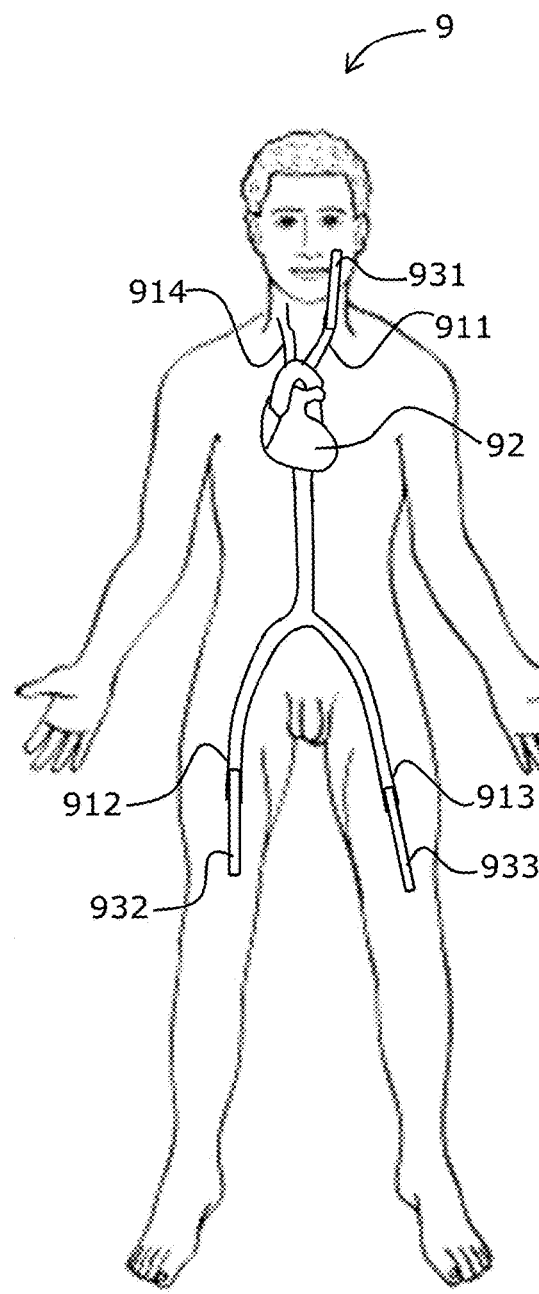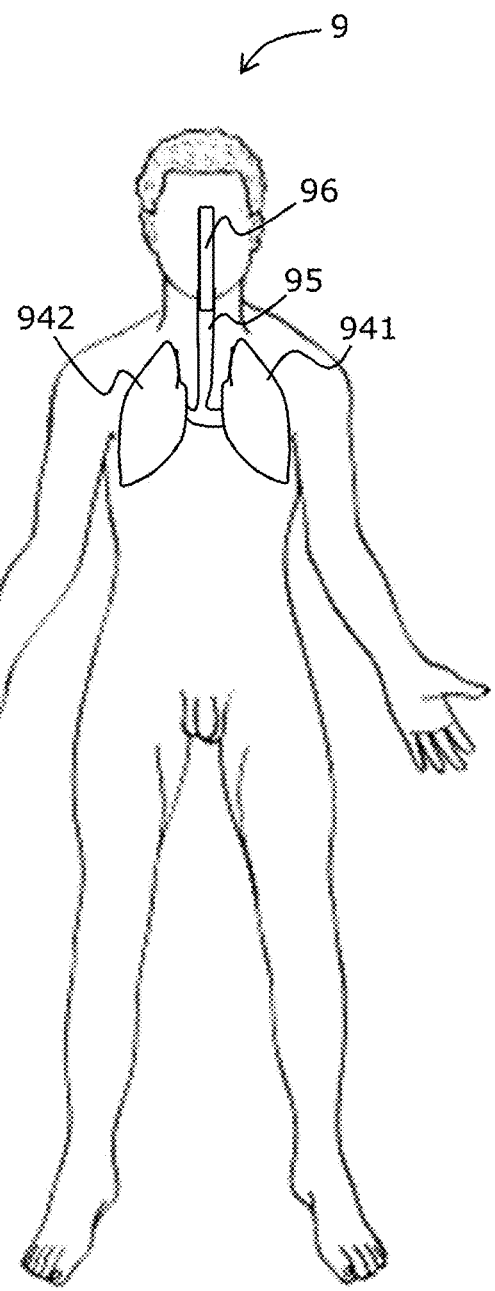

MEDICO-SURGICAL SIMULATOR AND MEDICO-SURGICAL SIMULATION METHOD

TECHNICAL FIELD

The present invention relates to the field of medico-surgical simulators.

More specifically, the present invention concerns a medico-surgical simulator with a very high degree of realism and a related method.

State of the Art

The purpose of medico-surgical simulators is to place surgeons in an operating theatre situation and to confront them with complex surgical procedures that they are likely to encounter in their practice.

Considering the growing constraints of cost-effectiveness in the field of surgical training, the practical training of surgeons, which is traditionally done through mentoring under the supervision of an experienced surgeon in an operating theatre, is becoming less and less practical because such mentoring is particularly time-consuming and, therefore, costly. That is why, over the last few years, medico-surgical simulation centres have appeared that use highly accurate, plastic, mannequin-like devices or robotic digital console devices. Surgical training in such centres has proven to be insufficient, however, and the cost of using and maintaining such devices remains very high. Other medico-surgical simulation centres use porcine models. However, the repetition of surgical movements in a clinical or quasi-clinical situations is essential to the initial training and continuing education of surgeons. Furthermore, animal experimentation may soon become totally prohibited in the United States and potentially in other countries around the world.

From the prior art, we are aware of medico-surgical simulation methods that consist of vascularising a human cadaver, which increases the realism of the simulation. Such methods are particularly disclosed in the following documents:

Novel simulation for training trauma surgeons, Aboud, Krisht, O'Keeffe, Nader, Hassan, Stevens, Ali, Luchette, Journal of traumatology 2011 December, 71(6):1487-90 (hereinafter Aboud 2011);

U.S. Pat. No. 6,824,389 B1.

Nevertheless, such methods of vascularising human cadavers are still unsatisfactory in terms of realism and/or cost for at least the following reasons:

They use relatively perfunctory simulation techniques, such as intra-aortic balloons or infusion reservoirs;

Liquid injected into the venous and arterial system of a cadaver is generally injected at a constant pressure and pulsation;

A heparin sodium injection is done at the end of the lavage process of the arterial and venous system of human cadaver torsos to eliminate all blood residues;

Surgical scenarios are manually supervised by a human operator;

Vascularisation of a human cadaver does not allow the difficulties that would occur due to the functioning of a living body, particularly during a torso surgery, to be reproduced.

A goal of the invention is to offer a medico-surgical simulator with a very high degree of realism that meets the growing need for surgical training in a context of reduced budgets for such training.

SUMMARY OF THE INVENTION

To this effect, the invention offers a medico-surgical simulator comprising:
  a vascularisation device arranged to vascularise a cardiovascular circuit, the vascularisation device comprising:
    means of connection arranged to connect the vascularisation device to a heart of a cadaver (preferably human) in such a way that the heart forms part of the cardiovascular circuit,
    a liquid injection system arranged to inject a liquid into the cardiovascular circuit and to set at least one injection parameter of the liquid in the cardiovascular circuit, the liquid preferably having a colour, temperature, texture, and/or viscosity comparable to that of standard blood,
    a liquid measurement system arranged to measure at least one parameter representative of a flow of liquid in the cardiovascular circuit,
  and/or
  a ventilation device arranged to ventilate a respiratory circuit, the ventilation device comprising:
    means of connection arranged to connect the ventilation device to lungs of the cadaver in such way that the lungs form part of the respiratory circuit,
    a gas injection system arranged to inject a gas into the respiratory circuit and to set at least one injection parameter of the gas in the respiratory circuit, the gas preferably being air,
    a gas measurement system arranged to measure at least one parameter representative of a flow of the gas in the respiratory circuit,
the medico-surgical simulator further comprising a regulation device arranged to:
  read at least one input parameter, the at least one input parameter comprising:
    one or more parameters among the at least one parameter measured by the liquid measurement system and/or by the gas measurement system, and/or
    one or more parameters among the at least one injection parameter of the liquid and/or the at least one injection parameter of the gas,
  set, via the liquid injection system and/or the gas injection system, at least one output parameter according to the at least one input parameter, the at least one output parameter comprising one or more parameters among the at least one injection parameter of the liquid and/or the at least one injection parameter of the gas, the at least one output parameter being different from the at least one input parameter.

Such a medico-surgical simulator has a very high degree of realism because it allows the cardiovascular and/or respiratory functions of a body to be simulated.

Preferably, the medico-surgical simulator may include the vascularisation device and the ventilation device.

The at least one injection parameter of the liquid may include a pressure and/or flow rate and/or frequency of injection of the liquid in the cardiovascular circuit.

In one embodiment, the liquid injection system may include:
- one or more injection electrovalves arranged to adjust the flow rate and/or frequency of injection of the liquid in the cardiovascular circuit, and/or
- a liquid pressure regulator arranged to adjust the injection pressure of the liquid in the cardiovascular circuit.

The at least one parameter representative of a flow of the liquid in the cardiovascular circuit may include a flow rate of the liquid in the cardiovascular circuit.

In one embodiment, the liquid measurement system may comprise one or more flowmeters arranged to measure the flow rate of the liquid in the cardiovascular circuit.

The liquid measurement system may further comprise an intracardiac pressure sensor arranged to measure an intracardiac pressure of the liquid in the heart, this intracardiac pressure constituting a parameter representative of the flow of the liquid in the cardiovascular circuit.

The at least one injection parameter of the gas may include a pressure and/or flow rate and/or frequency of injection of the gas in the respiratory circuit.

In one embodiment, the gas injection system may include:
- a pneumatic distributor arranged to adjust the flow rate and/or frequency of injection of the gas in the respiratory circuit, and/or
- a gas pressure regulator arranged to adjust the injection pressure of the gas in the respiratory circuit.

The at least one parameter representative of a flow of the gas in the respiratory circuit may comprise a flow rate of the gas in the respiratory circuit.

In one embodiment, the gas measurement system may comprise a pneumatic flowmeter arranged to measure the flow rate of the gas in the respiratory circuit.

According to one variant of the invention, the regulation device may comprise means to manually input one or more parameters among the at least one injection parameter of the liquid and/or the at least one injection parameter of the gas as an input parameter.

According to another variant of the invention, which is compatible with the other variants or embodiments, the regulation device may comprise a computer memory in which one or more of the following models are stored:
- A cardiac-respiratory model in which the regulation device reads as input parameter(s) one or more among the at least one injection parameter of the liquid and sets as output parameter(s), via the gas injection system, one or more among the at least one injection parameter of the gas according to the input parameter(s);
- A respiratory-cardiac model in which the regulation device reads as input parameter(s) one or more among the at least one injection parameter of the gas and sets as output parameter(s), via the liquid injection system, one or more among the at least one injection parameter of the liquid according to the input parameter(s);
- A cardiac-cardiac model in which the regulation device reads as input parameter(s) one or more among the at least one injection parameter of the liquid and sets as output parameter(s), via the liquid injection system, one or more among the at least one injection parameter of the liquid according to the input parameter(s), the output parameter(s) being different from the input parameter(s);
- A respiratory-respiratory model in which the regulation device reads as input parameter(s) one or more among the at least one injection parameter of the gas and sets as output parameter(s), via the gas injection system, one or more among the at least one injection parameter of the gas according to the input parameter(s), the output parameter(s) being different from the input parameter(s).

Preferably, an increase in the input parameter(s) leads to an increase in the output parameter(s) and a decrease in the input parameter(s) leads to a decrease in the output parameter(s).

The setting of the output parameter(s) is preferably a linear or parabolic or polynomial function of the input parameter(s). A linear function offers the advantage of simplicity. Polynomial function offers the advantage of simulating the physiological functions with more realism than the linear or parabolic function.

Preferably, the computer memory comprises several recorded scenarios, each scenario corresponding to a combination of several models, this combination being specific to the scenario.

Such scenarios allow situations that are likely to be encountered in the operating theatre to be simulated.

In one embodiment, the vascularisation device may further comprise three conduits and the connection means of the vascularisation device comprise three cannulae respectively connected to said three conduits, said cannulae and conduits being arranged to connect the vascularisation device, by the cannulae, to three arteries of the cadaver, forming an arterial network in such a way as to allow an injection of the liquid into the arterial network by at least one of the cannulae.

In such an embodiment, the vascularisation device may further comprise:
- three circulation mechanisms respectively mounted on each of the three conduits, the circulation mechanism associated with each of the conduits being arranged to selectively take two positions:
  - an injection position in which the liquid can circulate in the conduit through the circulation mechanism from the liquid injection system to the arterial network and in which the liquid cannot circulate in the conduit through the circulation mechanism from the arterial network to the liquid injection system,
  - an evacuation position in which the liquid can circulate in the conduit through the circulation mechanism from the arterial network to the liquid injection system and in which the liquid cannot circulate in the conduit through the circulation mechanism from the liquid injection system to the arterial network,
- a selector arranged to select at least two liquid injection modes from among:
  - a pressurised mode in which the three circulation mechanisms are placed in the injection position,
  - a circulation mode in which one or two of the circulation mechanisms are placed in the injection position and in which the other circulation mechanism(s) are placed in the evacuation position.

The pressurised mode economises liquid injected into the arterial network, revascularises the organs or viscera of the thorax and/or abdomen, giving them a colour, texture, and temperature similar to reality, and obtains a flow rate, pressure, and turgescence of the venous system, for example, before the evacuation of the liquid via the venous cannulae placed at the jugular and femoral levels.

The circulation mode allows the permeability of each artery and of the cardiovascular circuit of the cadaver to be evaluated. It also allows one to find the most appropriate scenario or combination of models or setting of the output parameter(s). The circulation mode also allows learners to feel a liquid flow in the vascular system of the cadaver (for example, swelling of the artery below or above a clamp but not on each side, etc.).

In one embodiment, the connection means of the ventilation device can be arranged to connect the ventilation device to a trachea of the cadaver in such a way that the trachea forms part of the respiratory circuit and in that the gas injection system comprises an orotracheal tube arranged to inject gas into the trachea.

The present invention also relates to a method of medico-surgical simulation comprising:
- a vascularisation step in which a cardiovascular circuit is vascularised by a vascularisation device, this vascularisation step comprising:
  - a connection step in which the vascularisation device is connected by connection means to a cadaver heart (preferably human) in such a way that the heart forms part of the cardiovascular circuit,
  - a liquid injection step in which a liquid is injected into the cardiovascular circuit by a liquid injection system,
  - an adjustment step in which at least one injection parameter of the liquid is set by the liquid injection system,
  - preferably a measurement step in which at least one parameter representative of a flow of liquid in the cardiovascular circuit is measured by a liquid measurement system, and/or
- a ventilation step in which a respiratory circuit is ventilated by a ventilation device, this ventilation step comprising:
  - a connection step in which the ventilation device is connected by connection means to lungs of the cadaver in such a way that the lungs form part of the respiratory circuit,
  - a gas injection step in which a gas is injected into the respiratory circuit by a gas injection system,
  - an adjustment step in which at least one injection parameter of the gas is set by the gas injection system,
  - preferably a measurement step in which at least one parameter representative of a flow of the gas in the respiratory circuit is measured by a gas measurement system, the medico-surgical simulation method further comprising a regulation step in which:
- a regulation device reads at least one input parameter, the at least one input parameter comprising:
  - one or more parameters among the at least one parameter measured by the liquid measurement system and/or by the gas measurement system, and/or
  - one or more parameters among the at least one injection parameter of the liquid and/or the at least one injection parameter of the gas,
- the regulation device, via the liquid injection system and/or the gas injection system, sets at least one output parameter according to the at least one input parameter, the at least one output parameter comprising one or more parameters among the at least one injection parameter of the liquid and/or the at least one injection parameter of the gas, the at least one output parameter being different from the at least one input parameter.

Preferably, the medico-surgical simulation method may include the vascularisation step and the ventilation step.

The at least one injection parameter of the liquid may include a pressure and/or flow rate and/or frequency of injection of the liquid in the cardiovascular circuit.

In one implementation mode, the liquid injection system may include:
- a step of adjusting, by one or more injection electrovalves, the flow rate and/or frequency of injection of the liquid in the cardiovascular circuit, and/or
- a step of adjusting, by a liquid pressure regulator, the injection pressure of the liquid in the cardiovascular circuit.

The at least one parameter representative of a flow of the liquid in the cardiovascular circuit may include a flow rate of the liquid in the cardiovascular circuit.

In one implementation mode, in the vascularisation step, the measurement step may comprise a measurement, by one or more flowmeters, of the flow rate of the liquid in the cardiovascular circuit.

In the vascularisation step, the measurement step may further comprise a measurement, by an intracardiac pressure sensor, of an intracardiac pressure of the liquid in the heart, this intracardiac pressure constituting a parameter representative of the flow of the liquid in the cardiovascular circuit.

The at least one injection parameter of the gas may include a pressure and/or flow rate and/or frequency of injection of the gas in the respiratory circuit.

In one implementation mode, the gas injection step may comprise:
- a step of adjusting, by a pneumatic distributor, the flow rate and/or frequency of injection of the gas in the respiratory circuit, and/or
- a step of adjusting, by a gas pressure regulator, the injection pressure of the gas in the respiratory circuit.

The at least one parameter representative of a flow of the gas in the respiratory circuit may comprise a flow rate of the gas in the respiratory circuit.

In the ventilation step, the measurement step may comprise a measurement, the gas measurement system, of the flow rate of the gas in the respiratory circuit.

In one implementation mode, the medico-surgical simulation method may comprise means to manually input one or more parameters among the at least one injection parameter of the liquid and/or the at least one injection parameter of the gas as an input parameter, via a user interface.

The regulation step may comprise a use of one or more models stored in a computer memory among the following:
- A cardiac-respiratory model in which the regulation device reads as input parameter(s) one or more among the at least one injection parameter of the liquid and sets as output parameter(s), via the gas injection system, one or more among the at least one injection parameter of the gas according to the input parameter(s);
- A respiratory-cardiac model in which the regulation device reads as input parameter(s) one or more among the at least one injection parameter of the gas and sets as output parameter(s), via the liquid injection system, one or more among the at least one injection parameter of the liquid according to the input parameter(s);
- A cardiac-cardiac model in which the regulation device reads as input parameter(s) one or more among the at least one injection parameter of the liquid and sets as output parameter(s), via the liquid injection system, one or more among the at least one injection parameter of the liquid according to the input parameter(s), the output parameter(s) being different from the input parameter(s);

A respiratory-respiratory model in which the regulation device reads as input parameter(s) one or more among the at least one injection parameter of the gas and sets as output parameter(s), via the gas injection system, one or more among the at least one injection parameter of the gas according to the input parameter(s), the output parameter(s) being different from the input parameter(s).

Preferably, the setting of the output parameter(s) is a linear or parabolic or polynomial function of the input parameter(s).

The computer memory may comprise several saved scenarios, each scenario corresponding to a combination of several models specific to the scenario.

In one implementation mode, the vascularisation step may further comprise a connection of the vascularisation device (by three cannulae connected to three respective conduits of the vascularisation device) to three respective arteries of the cadaver forming an arterial network in such a way as to allow an injection of the liquid into the arterial network by at least one of said cannulae.

The vascularisation step may further comprise a selection step, by a selector, of a liquid injection mode among:
 a pressurised mode in which three circulation mechanisms are placed in an injection position,
 a circulation mode in which one or two of the circulation mechanisms are placed in the injection position and in which the other circulation mechanism(s) are placed in an evacuation position,
the injection position being a position in which the liquid can circulate in a given conduit through a circulation mechanism mounted on said conduit from the liquid injection system toward the arterial network and in which the liquid cannot circulate in the conduit through the circulation mechanism from the arterial network toward the liquid injection system, the evacuation position being a position in which the liquid can circulate in a given conduit through the circulation mechanism mounted on the conduit from the arterial network toward the liquid injection system and in which the liquid cannot circulate in the conduit through the circulation mechanism from the liquid injection system toward the arterial network.

Preferably, in the ventilation step, the connection step comprises a connection of the ventilation device to a cadaver trachea, in such a way that the trachea forms part of the respiratory circuit and in which the gas injection step comprises an injection of the gas into the trachea via an orotracheal tube.

DESCRIPTION OF THE FIGURES AND EMBODIMENTS

Other advantages and distinctive features of the invention will become evident by reading the non-limiting detailed description of implementations and embodiments as well as the following attached drawings:

FIG. 1 schematically illustrates an embodiment of the medico-surgical simulator according to the invention;

FIGS. 2 and 3 respectively illustrate a cardiovascular circuit and respiratory circuit of a human cadaver to which a medico-surgical simulator according to the invention may be connected.

The embodiments described below, which are not exhaustive, may in particular be considered variants of the invention that comprise only a selection of the described features, isolated from the other described features (even if this selection is isolated within a sentence comprising the other features), if this selection of features is sufficient to confer a technical advantage or to differentiate the invention with respect to the prior art. The selection comprises at least one feature, preferably functional without structural details, or with only a part of the structural details if this part alone is sufficient to confer a technical advantage or to differentiate the invention with respect to the prior art.

An example of an embodiment of a medico-surgical simulator according to the invention is represented in FIG. 1.

In this example, the medico-surgical simulator comprises a vascularisation device 1, a ventilation device 2, and a regulation device 3 that controls the vascularisation device 1 and the ventilation device 2.

FIG. 1 shows that the vascularisation device 1 comprises three pathways A1, A2, and A3, represented by arrows directed toward the right side of the figure. Said pathways A1, A2, and A3 are conduits of the vascularisation device 1 respectively connected to three cannulae 931, 932, and 933 represented in FIG. 2. For example, conduit A1 is connected to cannula 931, conduit A2 is connected to cannula 932 and conduit A3 is connected to cannula 933. The connection between said conduits and cannulae, not shown in FIGS. 1 and 2, may be achieved by means of a conventional connection. For example, said conduits A1, A2, and A3 may be pipes with an interior diameter of 10 mm and the cannulae 931, 932, and 933 may be vascular cannulae inserted into said pipes and/or attached to these pipes by any known means of attachment.

In the example of FIGS. 1 and 2, the cannulae 931, 932, and 933 and the conduits A1, A2, and A3 are arranged to connect the vascularisation device 1 via the cannulae to three respective arteries 911, 912, 913 of a human cadaver 9. The arteries 911, 912, and 913 form an arterial network, in other words they are connected to one another in such a way that a liquid injected via one of these arteries, for example artery 911, may circulate in said artery 911 and travel through the arterial network so as to then circulate in arteries 912 and 913. In particular, the arrangement of the cannulae 931, 932, and 933 and the conduits A1, A2, and A3 allow a liquid to be injected into the arterial network via at least one of the cannulae.

Preferably, artery 911 is the left common carotid artery of the cadaver 9, artery 912 is the right femoral artery of the cadaver 9, and artery 913 is the left femoral artery of the cadaver 9.

The vascularisation device 1 therefore comprises connection means, such connection means comprising the cannulae 931, 932, and 933, arranged to connect the vascularisation device 1 to a heart 92 of a human cadaver 9 in such a way that the heart forms part of the cardiovascular circuit.

Regarding the ventilation device 2, FIG. 1 shows that the ventilation device comprises a pathway E1 represented by an arrow directed toward the right side of the figure. In this example, said pathway E1 is a conduit of the ventilation device 2 connected to an orotracheal tube 96 represented in FIG. 3.

In the example of FIGS. 1 and 3, the ventilation device 2 comprises connection means, these connection means comprising the orotracheal tube 96, arranged to connect the ventilation device 2 to the lungs 941 and 942 of the human cadaver 9 in such a way that said lungs form part of the respiratory circuit of the ventilation device 2. Furthermore, in this example, the connection means of the ventilation device 2 are arranged to connect said ventilation device 2 to a trachea 95 of the human cadaver 9 in such a way that said trachea 95 forms part of the respiratory circuit.

Thus, it is evident that according to the invention:
the vascularisation device 1 is arranged to vascularise a cardiovascular circuit, in this example the arteries 911, 912, and 913, as well as the heart 92 of the human cadaver 9 as illustrated in FIG. 2;
the ventilation device 2 is arranged to ventilate a respiratory circuit, in this example the trachea 95, as well as the lungs 941 and 942 of the human cadaver 9 as illustrated in FIG. 3.

Description of the Vascularisation Device

The vascularisation device 1 comprises a liquid injection system arranged to inject a liquid into the cardiovascular circuit and to set at least one injection parameter of the liquid in the cardiovascular circuit.

In reference to FIG. 1, the liquid injection system comprises three injection electrovalves 111, 121, and 131. Said injection electrovalves 111, 121, 131 are respectively mounted on injection conduits A11, A21, and A31 of the vascularisation device 1. The injection electrovalves 111, 121, and 131 are arranged to set a flow rate and/or an injection frequency of the liquid in the cardiovascular circuit. More precisely, the injection conduit A11 is connected to the conduit A1, the injection conduit A21 is connected to the conduit A2, and the injection conduit A31 is connected to the conduit A3, in such a way that a modification to the setting of the injection electrovalves 111, 121, and 131 in terms of flow rate and/or injection frequency translates into a modification of the flow rate and/or frequency with which the liquid is injected into the arterial network.

The injection conduits A11, A21, and A31, on which the injection electrovalves 111, 121, and 131 are mounted, are supplied with liquid by a common supply conduit A1C connected to the three injection conduits A11, A21, and A31 upstream from the injection electrovalves 111, 121, and 131.

Alternatively, the liquid injection system of the vascularisation device 1 may comprise one single injection electrovalve mounted on the common supply conduit A1C (not shown).

In the example of FIG. 1, the vascularisation device 1 also comprises three evacuation electrovalves 112, 122, and 132. Said evacuation electrovalves 112, 122, 132 are respectively mounted on evacuation conduits A12, A22, and A32 of the vascularisation device 1. The evacuation conduits A12, A22 et A32 are connected, on one hand, to the conduits A1, A2 et A3, i.e., to the arterial network and, on the other hand, to a common evacuation conduit A4.

Such an arrangement of the injection electrovalves 111, 121, and 131 and the evacuation electrovalves 112, 122, and 132 allow the liquid from the common supply conduit A1C to be injected into the arterial network via the injection conduits A11, A21, and A31 and allow the liquid from the arterial network to be evacuated toward the common evacuation conduit A4 via the evacuation conduits A12, A22, and A32.

The liquid injection system of FIG. 1 also comprises a liquid pressure regulator 14 arranged to adjust the injection pressure of the liquid in the cardiovascular circuit. Said liquid pressure regulator 14 is mounted on the common supply conduit A1C, in such a way that the pressure of the liquid coming from the injection conduits A11, A21, and A31 is adjusted by the liquid pressure regulator 14.

Thus, the at least one injection parameter of the liquid is set by the liquid injection system comprises in this example a pressure (adjusted by the liquid pressure regulator 14), as well as a flow rate and/or injection frequency (adjusted by the injection electrovalves 111, 121, and 131) of the liquid in the cardiovascular circuit.

In addition, the vascularisation device 1 also comprises a liquid measurement system arranged to measure at least one parameter representative of a flow of liquid in the cardiovascular circuit.

Said at least one parameter representative of a flow of the liquid in the cardiovascular circuit comprises a flow rate of the liquid in the cardiovascular circuit. To accomplish this, the liquid measurement system comprises at least one flowmeter (three flowmeters 151, 152, and 153 in the example of FIG. 1) arranged to measure the flow rate of the liquid in the cardiovascular circuit. In this example, the flowmeters 151, 152, and 153 are respectively mounted on the injection conduits A11, A21, and A31 upstream from the injection electrovalves 111, 121, and 131.

Alternatively, the liquid measurement system may comprise one single flowmeter mounted on the common supply conduit A1C (not shown).

In the example of FIG. 1, the liquid measurement system further comprises an intracardiac pressure sensor 16 arranged to measure an intracardiac pressure of the liquid in the heart, said intracardiac pressure constituting a parameter representative of the flow of the liquid in the cardiovascular circuit.

The intracardiac pressure sensor 16 is, for example, inserted into the heart 92 of the cadaver 9 of FIG. 2 via the right common carotid artery 914 of the cadaver 9.

Several liquid injection modes may be implemented by the vascularisation device 1 of the invention.

The injection electrovalves 111, 121, and 131 and the evacuation electrovalves 112, 122, and 132 constitute, in pairs, circulation mechanisms: the injection electrovalve 111 and the evacuation electrovalve 112 constitute a circulation mechanism 11 mounted on the conduit A1; the injection electrovalve 121 and the evacuation electrovalve 122 constitute a circulation mechanism 12 mounted on the conduit A2; the injection electrovalve 131 and the evacuation electrovalve 132 constitute a circulation mechanism 13 mounted on the conduit A3. Said circulation mechanisms 11, 12, and 13 are arranged to selectively take two positions:
an injection position in which the liquid can circulate in the conduit A1, A2, and/or A3 through the circulation mechanism 11, 12, and/or 13 from the liquid injection system toward the arterial network and in which the liquid cannot circulate in the conduit A1 A2 and/or A3 through the circulation mechanism 11, 12, and/or 13 from the arterial network to the liquid injection system,
an evacuation position in which the liquid can circulate in the conduit A1, A2, and/or A3 through the circulation mechanism 11, 12, and/or 13 from the arterial network to the liquid injection system and in which the liquid cannot circulate in the conduit A1, A2, and/or A3 through the circulation mechanism 11, 12, and/or 13 from the liquid injection system to the arterial network.

To select liquid injection modes, the vascularisation device 1 comprises a selector (not shown) arranged to select at least two liquid injection modes among:
a pressurised mode in which the three circulation mechanisms 11, 12, and 13 are placed in the injection position,
a circulation mode in which one or two of the circulation mechanisms are placed in the injection position and in which the other circulation mechanism(s) are placed in the evacuation position.

The selector (not shown) may consist of a graphic selector on a graphic user interface or of a mechanical switch with three positions, for example.

The circulation mode is preferably implemented, alternatively, in two different ways:
- divergent circulation: a circulation mechanism (for example, 11) is placed in the injection position and the two other circulation mechanisms (in the example, 12 and 13) are placed in the evacuation position: in the example described herein, the liquid is in this case injected into the arterial network via the left common carotid artery and is evacuated from the arterial network via the right and left femoral arteries, causing a liquid circulation in the arterial network from the top to the bottom of the human cadaver 9;
- convergent circulation: a circulation mechanism (for example, 11) is placed in the evacuation position and the two other circulation mechanisms (in the example, 12 and 13) are placed in the injection position: in the example described herein, the liquid is in this case injected into the arterial network via the right and left femoral arteries and is evacuated from the arterial network via the left common carotid artery, bringing about a liquid circulation in the arterial network from the top to the bottom of the human cadaver 9.

Preferably, the vascularisation device 1 of the invention further comprises, as illustrated in FIG. 1:
- a thermostatic mixer 171 supplied, for example, with hot water 17a and cold water 17b in such a way as to supply the common supply conduit A1C with a liquid (water) at a temperature around 37° C., +/− 1° C.; alternatively, this may be achieved using a water heater 172 that is adjusted and pressurised at no less than two bar, or by another means; and/or
- a supply tap 173 mounted on the common supply conduit A1C after the thermostatic mixer 171 or the water heater 172, said supply tap 173 preferably being manual and supplying the device with liquid; and/or
- a manometer pressure sensor 174, either digital or with a needle, mounted on the common supply conduit A1C downstream from the liquid pressure regulator 14 and upstream from the flowmeters 151, 152, and 153, to enable visual monitoring of the pressure of the liquid in this conduit; and/or
- a thermocouple thermometer 175, mounted on the common supply conduit A1C downstream from the liquid pressure regulator 14 and upstream from the flowmeters 151, 152, and 153, to enable visual monitoring of the temperature of the liquid in the conduit; and/or
- an injector 176, with a roller pump, for example, arranged to add a solution to the liquid circulating in the common supply conduit A1C, said solution making the liquid similar to blood in terms of colour and/or viscosity.

It is clear from this description that the expression "cardiovascular circuit" refers to a circuit comprising:
- a part belonging to the medico-surgical simulator according to the invention, in particular the conduits A1, A2, and A3;
- a part that does not belong to the medico-surgical simulator according to the invention, in particular the arteries 911, 912, and 913, and the heart 92 of the human cadaver 9.

Description of the Ventilation Device

The ventilation device 2 comprises a gas injection system arranged to inject a gas into the respiratory circuit. In the example of FIG. 1, said gas injection system comprises a pneumatic distributor 21 arranged to set a flow rate and/or frequency of injection of the gas in the respiratory circuit. In this example, the gas injection system also comprises a gas pressure regulator 24 mounted upstream from the pneumatic distributor 21 and arranged to adjust the injection pressure of the gas in the respiratory circuit. In addition, the gas injection system also comprises the orotracheal tube 96 arranged to inject the gas into the trachea 95 of the human cadaver 9 (see FIG. 3).

The gas injection system is arranged to set at least one injection parameter of the gas in the respiratory circuit, said at least one injection parameter of the gas comprising the pressure and/or flow rate and/or frequency of injection of the gas in the respiratory circuit.

The ventilation device 2 further comprises a gas measurement system arranged to measure at least one parameter representative of a flow of the gas in the respiratory circuit. Preferably, the at least one parameter representative of a flow of the gas in the respiratory circuit comprises a flow rate of the gas in the respiratory circuit. To accomplish this, the gas measurement system of FIG. 1 comprises a pneumatic flowmeter 25 arranged to measure the flow rate of the gas in the respiratory circuit.

Preferably, the ventilation device 2 of the invention further comprises, as illustrated in FIG. 1:
- a compressed air module 271, for example an air heater that is regulated and pressurized to at least two bar, allowing a gas in the form of air with a temperature approximately 37° C. to +/− 1° C. to be injected into the conduit E1, this heating mode 271 being supplied with air that is compressed to 8 bar, for example; and/or
- a supply tap 272 mounted on the common conduit E1 after the heating module 271 or upstream from the gas pressure regulator 24, this supply tap 272 preferably being manual and supplying the device with compressed air; and/or
- a manometer 273, mounted, for example, downstream from the gas pressure regulator 24 and upstream from the pneumatic flowmeter 25, said manometer 273 enabling visual monitoring of the air pressure circulating in the conduit E1; and/or
- an air filter 274 arranged to filter the air coming from the respiratory circuit, in order to avoid releasing air that was contaminated by passing through the lungs 941 and 942 of the cadaver 9 into the environment of the medico-surgical simulator.

It is clear from the present description that the expression "respiratory circuit" refers to a circuit comprising:
- a part belonging to the medico-surgical simulator according to the invention, in particular the conduit E1;
- a part that does not belong to the medico-surgical simulator according to the invention, in particular the trachea 95, as well as the lungs 941 and 942 of the human cadaver 9.

Description of the Regulation Device

The regulation device 3 is arranged to:
- read at least one input parameter, the at least one input parameter comprising:
  - one or more parameters among the at least one parameter measured by the liquid measurement system and/or by the gas measurement system, and/or
  - one or more parameters among the at least one injection parameter of the liquid and/or the at least one injection parameter of the gas,
- set, via the liquid injection system and/or the gas injection system, at least one output parameter according to the at least one input parameter, the at least one output parameter comprising one or more parameters among the at least one injection parameter of the liquid and/or the at least one injection parameter of the gas, the at least one output parameter being different from the at least one input parameter.

The regulation device 3 preferably comprises means or a "user interface" (for example, button, scroll wheel, computer keyboard and/or touchscreen, etc., not shown) to manually enter one or more parameters among the at least one injection parameter of the liquid and/or the at least one injection parameter of the gas as an input parameter. Such means (not shown) allow an instructor to manually trigger an event to simulate, for example, a cardiac arrest or a change in cardiac and/or respiratory rhythm.

Such input means (not shown) also allow an instructor to manually trigger a scenario such as described below.

To accomplish this, the regulation device 3 in the example of FIG. 1 comprises a computer memory 4 in which one or more models are stored, among the following:

- A cardiac-respiratory model in which the regulation device 3 reads as input parameter(s) one or more among the at least one injection parameter of the liquid and sets as output parameter(s), via the gas injection system, one or more among the at least one injection parameter of the gas according to the input parameter(s);
- A respiratory-cardiac model in which the regulation device reads as input parameter(s) one or more among the at least one injection parameter of the gas and sets as output parameter(s), via the liquid injection system, one or more among the at least one injection parameter of the liquid according to the input parameter(s);
- A cardiac-cardiac model in which the regulation device reads as input parameter(s) one or more among the at least one injection parameter of the liquid and sets as output parameter(s), via the liquid injection system, one or more among the at least one injection parameter of the liquid according to the input parameter(s), the output parameter(s) being different from the input parameter(s);
- A respiratory-respiratory model in which the regulation device reads as input parameter(s) one or more among the at least one injection parameter of the gas and sets as output parameter(s), via the gas injection system, one or more among the at least one injection parameter of the gas according to the input parameter(s), the output parameter(s) being different from the input parameter(s).

The setting of the output parameters is, for example, a linear or parabolic or polynomial function of the input parameters, and preferably a polynomial function.

In addition, in this example, the computer memory 4 comprises several stored scenarios, each scenario corresponding to a combination of several models specific to the scenario. Examples of scenarios are given below.

The regulation device 3 comprises a computer (not shown) and software (not shown) enabling it to perform its functions.

The regulation device 3 comprises only technical means: computer and/or software and/or electronic means and/or mechanical means.

Examples of Implementation of the Medico-Surgical Simulator

Aside from the insertion of the cannulae 931, 932, and 933 (oriented toward the heart) in the left femoral arteries 913 and right femoral arteries 912 and in the left common carotid artery 911, and the insertion into the right common carotid artery 914 of the intracardiac probe 16, cannulae (not shown) are also inserted into the internal jugular veins (not shown, cannulae oriented toward the heart) and in the femoral veins (not shown, cannulae oriented toward the inferior vena cava). In addition, the head and the extremities of the four members of the cadaver 9 are excluded by ligature of the iliac vessels downstream from the cannulae, at the bilateral cervical level and at the bilateral femoral and brachial level. This distal and peripheral exclusion allows vascularisation of the trunk (thorax or abdomen) to be optimally achieved. But the position of the cannulae and ligatures may be reviewed to allow a member to be revascularised if necessary.

Initialisation Process

A first step consists of determining the initial liquid and gas injection pressure. To do this, an instructor sets the injection pressure of the liquid, using the liquid pressure regulator 14, to reach an intracardiac pressure of 140 mmHg measured by the intracardiac probe 16. First, the regulation device 3 controls the three injection electrovalves 111, 121, and 131 at an initial defined cardiac frequency (typically: 60 beats per minute, 31% of systole). To achieve this, a corresponding square wave signal (typically: 1 Hz, 31% of mid-cycle) controls the injection electrovalves via an I/O card, by the computer of the regulation device. Second, the liquid injection pressure is determined by a setting of the liquid injection pressure regulator 14 controlled by the PC, via the I/O card, in voltage to obtain a value of 0.05 bar (weak initial injection pressure at first). Next, the regulation device software 3 progressively increases the driving voltage of the liquid injection pressure regulator 14 up to a measurement by intracardiac probe 16 of 140 mmHg; the instructor setting the device may use the information provided by the pressure sensor 174.

At this stage, on the respiratory level, with regard to the gas injection pressure, the software begins controlling the pneumatic distributor 21 at a frequency that is typically 40 cycles per minute (0.66 Hz, 50% of inspiration) using a square wave signal sent via the I/O card. The regulation device software 4 drives, with voltage, the gas pressure regulator 24 in order to reach a pressure of 0.05 bar for the gas injected in the lungs 941, 942 at the start of the session (value measured by the flowmeter 273 and, for example, transmitted to the computer to be displayed on the control screen). Next, the software increases the controlling voltage of the gas pressure regulator 24 until an injected air pressure of 0.4 bar is reached (this value can be changed by the instructor depending on the desired movement of the rib cage of the cadaver 9). The increase occurs progressively (duration=about 2 to 3 minutes) in order to progressively pressurise the lungs 941 and 942, to use pulmonary compliance and rib cage compliance and to avoid pleuropulmonary barotraumas that may compromise respiratory movements (compliance cycle).

The initial values from this initialisation process are saved by the computer memory 4 and are defined in the following manner, for example:

- initial cardiac frequency (F card init),
- initial systole/diastole ratio (% systole init),
- initial injection pressure of the synthetic blood (P card initial),
- initial respiratory frequency (F resp init),
- inspiration/expiration ratio (% insp init),
- respiratory insufflation pressure (P resp init).

Simulation of a Cardiac Arrest Initiated by the Instructor

In the context of a cardiac arrest scenario, the instructor may wish to simulate a cardiac arrest in the vascularised cadaver 9 and to initiate it. When the instructor initiates this scenario, a learner receives visual information via the intermediary of a medical monitor (medical scope) in the form of: modification of cardiac rhythm by progressive bradycardia, then asystole.

When this scenario is initiated, the computer adapts, according to the predetermined scenario stored in the computer memory 4, the square wave signal sent to the three injection electrovalves 111, 121, 131 by progressively or very rapidly decreasing its frequency, as well as the mid-cycle ratio: decrease in the systole/diastole ratio correlated with a decrease in cardiac frequency (constitutive equation of cardiac arrest, cardiac frequency=f(time)). During this phase of decrease in cardiac frequency, only the three injection electrovalves are activated in a time-based manner, while the three evacuation electrovalves 112, 122, and 132 are not changed. The decrease will continue until the signal sent to the electrovalves is stopped (cardiac arrest). Throughout this decrease in cardiac rhythm, the information obtained by the intracardiac probe 16 are visually transmitted to the learner via the medical monitor.

Likewise, a decrease in pressure in the cardiovascular circuit is induced (so that the learner can feel on the vascularised cadaver 9: disappearance of aortic pulse). To simulate this phenomenon, the software (by computer via the I/O card) decreases the voltage sent to the liquid pressure regulator 14 until there is no pressure in the common supply conduit A1C (measurement taken by the pressure sensor 174). The computer calculates this decrease in function from an arterial pressure=f(time) constitutive equation. This has the effect of decreasing the intracardiac pressure (measured by the intracardiac probe 16 and displayed on the medical monitor).

There is no physical change to the respiratory circuit. The rib cage keeps the same movement (in a real operating theatre, a machine continues to inject gas).

On the other hand, on the medical monitor, the oximetry is progressively decreased up to 60% to signify to the learner that the patient is deceased. The computer performs this modification on the medical monitor. The speed of decrease in oximetry is predefined in the computer.

Simulation of a Simple Modification of Cardiac Rhythm Initiated by the Instructor The instructor defines a new cardiac frequency value and, therefore, the systole/diastole ratio. Next, the software sends the injection electrovalves 111, 121, 131 the square wave signal that corresponds to the desired parameters. The time to reach the new cardiac frequency value is also defined by the instructor (a tenth of a second). Modification of the cardiac rhythm is given to the learner visually via the medical monitor.

A return to the initial cardiac frequency values follows the same process, but in the opposite direction.

Simulation of a Modification of Respiratory Rhythm Initiated by the Instructor

Ventilatory frequency and inspiration/expiration ratio can also be modified depending on the scenario. The physical result on the cadaver 9 is characterised by the modification of the frequency of expansion of the rib cage and movements of the diaphragm, which may hinder the learner during surgery. This must also be shown visually for the learner on the medical monitor by modifying parameters: capnography ($CO_2$ concentration) pulse oximetry, respiratory frequency. The software visually refreshes in real time on the medical monitor.

The software must then modify the square wave signal sent to the pneumatic distributor 21, calculated from respiratory data provided by the instructor (number of cycles per minute and inspiration/expiration ratio). This modification (increase or decrease in respiratory frequency) calculated by the software may be performed over a certain period defined by the instructor (acceleration or deceleration of respiratory frequency).

There is no change to the insufflation pressure.

This ventilatory modification can continue until respiratory arrest, i.e., a complete arrest of movement of the thorax and diaphragm and corresponding translation on the medical monitor by a drop in capnography and pulse oximetry. In this case, the software switches off the pneumatic distributor 21.

Restarting ventilation is done in the same way, but in the opposite direction. In other words, the instructor gives the software new respiratory parameters (number of cycles per minute and inspiration/expiration ratio). It can also reinitialise the initial respiratory parameters. The software then calculates the frequency of the new adequate square wave signal sent to the pneumatic distributor 21 (via the I/O card). The progressive restarting of respiration (increase in respiratory frequency) takes place over a period defined by the instructor according to a constitutive equation of the type "Restarting respiratory frequency=f(time)". The respiratory parameters (capnography, pulse oximetry and respiratory frequency) are then updated on the medical monitor in real time to give the information to the learner.

In the present description, the expression "=f(X)" means "is a function of X".

Transition from the Arterial Pressurisation Mode (Non-Circulating) to the Arterial Blood Circulation Mode As indicated above, the (pulsatile) vascularisation of the cadaver 9 can function according to three liquid injection modes.

The pressurisation mode, in which there is no significant circulation of the liquid in the cardiovascular circuit. This allows leaks to be detected more easily and to minimise the quantity of liquid that is used. This is the main mode that is used. When the three evacuation electrovalves 112, 122, 132 are closed, i.e., not voltage-controlled by the computer (via the I/O card), the pulsatility of the arterial network of the vascularised cadaver is achieved by pressurisation of the fluid columns of the arterial network. Pulsatility is achieved by driving the three injection electrovalves 112, 122, 132. The liquid flows only through the venous system after passing through the organs (heart 92). This mode of operation offers the advantage of consuming less liquid, revascularising the organs or viscera of the thorax and/or abdomen of the cadaver, giving them a better colour (higher concentration of colourant), texture, and temperature similar to reality, and obtaining a flow rate, pressure, and turgescence of the venous system before a flow of the liquid from the venous cannulae toward the exterior.

The divergent circulation mode (circulation from the upper body toward the lower body): in this case, the computer, after receiving a command from the instructor, performs the following tasks:

Send a square wave signal to the injection electrovalve 111 injecting the liquid into the carotid artery 911 (function of cardiac frequency and the systole/diastole ratio), Close (switch off) the two other injection electrovalves 121, 131 connected to the femoral arteries 912, 913, Open (switch on) the two evacuation electrovalves 122, 132 connected to the femoral arteries by sending a continuous (non-pulsatile) voltage via the I/O card, Close (switch off) the evacuation electrovalve 112 connected to the carotid artery.

The convergent circulation mode (circulation from the lower body toward the upper body): the instructor can also reverse the direction of circulation by commanding the PC:

Send a square wave signal to the two injection electrovalves 121, 131 connected to the femoral arteries 912, 913 (function of the cardiac frequency and the systole/diastole ratio), Close (switch off) the injection electrovalve 111 connected to the carotid artery 911, Open the evacuation electrovalve 112 connected to the carotid artery by sending a continuous (non-pulsatile) voltage via the I/O card, Close (no voltage) the two evacuation electrovalves 122, 132 connected to the femoral arteries.

Scenario Not Initiated by the Instructor: Accidental Vascular wound

In brief, an accidental vascular wound created by the learner during the course of a surgical scenario leads to a leak of liquid (simulating blood) and therefore a reduction in pressure in the cardiovascular circuit.

In such a case, there is a significant increase in the flow rate of the injected liquid measured by the flowmeters 151, 152, 153. If the software detects such an increase in flow rate, it must then:

Display the drop in blood pressure on the medical monitor using data gathered by the intracardiac probe 16, Calculate the increase in cardiac frequency (as well as the systole/diastole ratio) according to the constitutive equation (cardiac frequency=f(injected flow rate)) defined by the scenario. The systole/diastole ratio is determined using the cardiac frequency. This modification of the cardiac frequency will be displayed on the medical monitor. The new square wave signal that is calculated will be sent to the three injection electrovalves 111, 121, 131 to modify the pulse the learner physically feels on the vascularised cadaver 9, There is no change to the respiratory frequency. p After a period predefined by the instructor, without control of the vascular wound and, therefore, with persistence of a measured elevated flow rate, a new response is induced with reduction in heart rate (and therefore collapse of circulatory pressure) showing the learner the severity of the hemodynamic situation.

The software commands a decrease in the square wave signal frequency driving the three injection electrovalves, according to a constitutive equation defined by the instructor (cardiac frequency=f(time) or taken from the predefined models available in the computer memory 4).

Likewise, the cardiac frequency and intracardiac pressure are modified in real time on the medical monitor to give visual information to the learner.

The injection pressure of the liquid is decreased by lowering the voltage sent by the computer (via the I/O card) to the liquid pressure regulator 14. The speed at which the injection pressure is decreased will be defined by the instructor or preprogrammed, for example, for 10 seconds.

If the vascular wound is repaired, the recorded flow rate returns to the initial base situation and the automatic reaction brings all the constants back to their initial state. In such case, the computer modifies the square wave signals sent to each of the three injection electrovalves 111, 121, 131 and to the pneumatic distributor 21 with the values initially defined above.

If the vascular world is not repaired, the circulatory arrest scenario begins. This translates into a complete stoppage of the three injection electrovalves and the pneumatic distributor. The computer no longer transmits square wave signals to these actuators.

The scenario that was just described can also be initiated by a loss of intracardiac pressure measured by the intracardiac probe 16.

Optionally, when one of the three injection electrovalves receives a square wave signal (via the I/O card) from the computer, the latter commands the start of the injector (roller pump) 176 to inject red colourant into the liquid in the common supply conduit A1C, thereby simulating blood.

Thermocouples (for example, the thermometer 175) allow the temperature of the injected liquid and gas to be displayed in real time on the medical monitor.

The liquid injected by one or more of the cannulae, depending on the permeability of the iliac vessels and the intended scenario, simulates blood in colour, temperature, texture, and viscosity. This simulation liquid uses the arterial network in the traditional functional anatomical direction, reaches the viscera, revascularises them via the capillaries and returns to the venous cannulae following the physiological direction of blood. It is then eliminated from the body.

The arterial inputs allow a pressure column to be maintained in the arterial system. Electrovalves 111, 121, and 131 provide the pulsatile dimension of this liquid column thereby minimising the heartbeats transmitted to the vessels for the surgeon.

The flow of simulated blood in the organs gives them a realistic colour, temperature, and texture.

The absence of a heartbeat does not pose a problem for cardiac surgery since it is performed clinically under cold cardioplegia and ECC in the proposed scenarios.

In the description above, the cadaver (9) is a human cadaver. However, the invention can be implemented on a non-human animal cadaver.

Of course, the invention is not limited to the examples that were just described and many adjustments can be made to these examples without going outside the scope of the invention. For example, a suction device (not shown) can be used to suck liquids out of the stomach of the cadaver and to prevent the stomach from swelling. Such a suction device (not shown) may consist of a stomach tube (Faucher tube) connected to a suction (vacuum) system thereby allowing liquids in the stomach to be sucked out. Such a stomach tube may be inserted via the mouth of the cadaver so as to position the aspirating end in the stomach. In addition, different features, forms, variants and embodiments of the invention may be combined with one another according to various combinations, to the extent that they are not incompatible or exclusive of one another.

The invention claimed is:

1. Medico-surgical simulator comprising at least the vascularisation device (1) among:
    a vascularisation device (1) arranged to vascularise a cardiovascular circuit, the vascularisation device (1) comprising:
        means of connection (931, 932, 933) arranged to connect the vascularisation device (1) to a heart (92) of a cadaver (9) in such a way that the heart forms part of the cardiovascular circuit,
        a liquid injection system arranged to inject a liquid into the cardiovascular circuit and to set at least one injection parameter of the liquid in the cardiovascular circuit, a liquid measurement system (151, 152, 153, 16) arranged to measure at least one parameter representative of a flow of liquid in the cardiovascular circuit, and a ventilation device (2) arranged to ventilate a respiratory circuit, the ventilation device comprising:
  means of connection (96) arranged to connect the ventilation device to the lungs (941, 942) of the cadaver in such a way that the lungs form part of the respiratory circuit,
  a gas injection system arranged to inject a gas into the respiratory circuit and to set at least one injection parameter of the gas in the respiratory circuit,
  a gas measurement system (25) arranged to measure at least one parameter representative of a flow of gas in the respiratory circuit,
the medico-surgical simulator further comprising a regulation device (3) arranged to:
read at least one input parameter, the at least one input parameter comprising:
  one or more parameters among the at least one parameter measured by the liquid measurement system and/or by the gas measurement system, and/or
  one or more parameters among the at least one injection parameter of the liquid and/or the at least one injection parameter of the gas,
set, via the liquid injection system and/or the gas injection system, at least one output parameter according to the at least one input parameter, the at least one output parameter comprising one or more parameters among the at least one injection parameter of the liquid and/or the at least one injection parameter of the gas, the at least one output parameter being different from the at least one input parameter,
  the vascularisation device further comprising three conduits (A1, A2, A3) and wherein the connection means of the vascularisation device comprise three cannulae (931, 932, 933) respectively connected to said three conduits, such cannulae and conduits being arranged to connect the vascularisation device, by the cannulae, to three respective arteries (911, 912, 913) of the cadaver, forming an arterial network in such a way as to allow an injection of the liquid into the arterial network via at least one of these cannulae,
wherein the vascularisation device further comprises:
  three circulation mechanisms (11, 12, 13) respectively mounted on each of the three conduits, the circulation mechanism associated with each of these conduits being arranged to selectively take two positions:
    an injection position in which the liquid can circulate in the conduit through the circulation mechanism from the liquid injection system to the arterial network and in which the liquid cannot circulate in the conduit through the circulation mechanism from the arterial network to the liquid injection system,
    an evacuation position in which the liquid can circulate in the conduit through the circulation mechanism from the arterial network to the liquid injection system and in which the liquid cannot circulate in the conduit through the circulation mechanism from the liquid injection system to the arterial network,
  a selector arranged to select at least two liquid injection modes from among:
    a pressurised mode in which the three circulation mechanisms are placed in the injection position,
    a circulation mode in which one or two of the circulation mechanisms are placed in the injection position and in which the other circulation mechanism(s) are placed in the evacuation position.

2. Medico-surgical simulator according to claim 1, further comprising the vascularisation device and the ventilation device.

3. Medico-surgical simulator according to claim 1, wherein the at least one injection parameter of the liquid comprises a pressure and/or flow rate and/or frequency of injection of the liquid in the cardiovascular circuit.

4. Medico-surgical simulator according to claim 3, wherein the liquid injection system comprises:
  one or more injection electrovalves (111, 121, 131) arranged to adjust the flow rate and/or injection frequency of the liquid in the cardiovascular circuit, and/or
  a liquid pressure regulator (14) arranged to adjust the injection pressure of the liquid in the cardiovascular circuit.

5. Medico-surgical simulator according to claim 1, wherein the at least one parameter representative of a flow of liquid in the cardiovascular circuit comprises a flow rate of the liquid in the cardiovascular circuit.

6. Medico-surgical simulator according to claim 5, wherein the liquid measurement system comprises one or more flowmeters (151, 152, 153) arranged to measure the flow rate of the liquid in the cardiovascular circuit.

7. Medico-surgical simulator according to claim 1, wherein the liquid measurement system further comprises an intracardiac pressure sensor (16) arranged to measure an intracardiac pressure of the liquid in the heart, said intracardiac pressure constituting a parameter representative of the flow of the liquid in the cardiovascular circuit.

8. Medico-surgical simulator according to claim 1, wherein the at least one injection parameter of the gas comprises a pressure and/or flow rate and/or frequency of injection of the gas in the respiratory circuit.

9. Medico-surgical simulator according to claim 8, wherein the gas injection system comprises:
  a pneumatic distributor (21) arranged to adjust the flow rate and/or frequency of injection of the gas in the respiratory circuit, and/or
  a gas pressure regulator (24) arranged to adjust the injection pressure of the gas in the respiratory circuit.

10. Medico-surgical simulator according to claim 1, wherein the at least one parameter representative of a flow of gas in the respiratory circuit comprises a flow rate of the gas in the respiratory circuit.

11. Medico-surgical simulator according to claim 10, wherein the gas measurement system comprises a pneumatic flowmeter (25) arranged to measure the flow rate of the gas in the respiratory circuit.

12. Medico-surgical simulator according to claim 1, wherein the regulation device comprises means to manually input one or more parameters among the at least one injection parameter of the liquid and/or the at least one injection parameter of the gas as an input parameter.

13. Medico-surgical simulator according to claim 1, wherein the regulation device comprises a computer memory (4) in which one or several of the following models are stored:
  A cardiac-respiratory model in which the regulation device reads as input parameter(s) one or more among the at least one injection parameter of the liquid and sets as output parameter(s), via the gas injection system, one or more among the at least one injection parameter of the gas according to the input parameter(s);

A respiratory-cardiac model in which the regulation device reads as input parameter(s) one or more among the at least one injection parameter of the gas and sets as output parameter(s), via the liquid injection system, one or more among the at least one injection parameter of the liquid according to the input parameter(s);

A cardiac-cardiac model in which the regulation device reads as input parameter(s) one or more among the at least one injection parameter of the liquid and sets as output parameter(s), via the liquid injection system, one or more among the at least one injection parameter of the liquid according to the input parameter(s), the output parameter(s) being different from the input parameter(s);

A respiratory-respiratory model in which the regulation device reads as input parameter(s) one or more among the at least one injection parameter of the gas and sets as output parameter(s), via the gas injection system, one or more among the at least one injection parameter of the gas according to the input parameter(s), the output parameter(s) being different from the input parameter(s).

14. Medico-surgical simulator according to claim 13, wherein the setting of the output parameter(s) is a linear or parabolic or polynomial function of the input parameter(s).

15. Medico-surgical simulator according to claim 13, wherein the computer memory comprises several stored scenarios, each scenario corresponding to a combination of the several models, this combination being specific to the scenario.

16. Medico-surgical simulator according to claim 1, wherein the connection means of the ventilation device are arranged to connect the ventilation device to a trachea (95) of the cadaver in such a way that the trachea forms part of the respiratory circuit and in that the gas injection system comprises an orotracheal tube (96) to inject gas into the trachea.

17. Medico-surgical simulation method comprising at least the vascularisation step among:

a vascularisation step in which a cardiovascular circuit is vascularised by a vascularisation device (1), this vascularisation step comprising:
  a connection step in which the vascularisation device is connected by means of connection (931, 932, 933) to a heart (92) of a cadaver (9) in such a way that the heart forms part of the cardiovascular circuit,
  a liquid injection step in which a liquid is injected into the cardiovascular circuit by a liquid injection system,
  an adjustment step in which at least one injection parameter of the liquid is set by the liquid injection system, and a ventilation step in which a respiratory circuit is ventilated by a ventilation device (2), this ventilation step comprising:
  a connection step in which the ventilation device is connected by connection means (96) to lungs (941, 942) of the cadaver (9) in such a way that the lungs form part of the respiratory circuit,
  a gas injection step in which a gas is injected into the respiratory circuit by a gas injection system,
  an adjustment step in which at least one injection parameter of the gas is set by the gas injection system, the medico-surgical simulation method further comprising a regulation step in which:

a regulation device (3) reads at least one input parameter, the at least one input parameter comprising:
  one or more parameters among the at least one parameter measured by the liquid measurement system and/or by the gas measurement system, and/or
  one or more parameters among the at least one injection parameter of the liquid and/or the at least one injection parameter of the gas, the regulation device (3) sets, via the liquid injection system and/or the gas injection system, at least one output parameter according to the at least one input parameter, the at least one output parameter comprising one or more parameters among the at least one injection parameter of the liquid and/or the at least one injection parameter of the gas, the at least one output parameter being different from the at least one input parameter, the vascularisation device further comprising three conduits (A1, A2, A3) and wherein the connection means of the vascularisation device comprise three cannulae (931, 932, 933) respectively connected to said three conduits, such cannulae and conduits connecting the vascularisation device, by the cannulae, to three respective arteries (911, 912, 913) of the cadaver, forming an arterial network in such a way as to allow an injection of the liquid into the arterial network via at least one of these cannulae, wherein the vascularisation device further comprises:

three circulation mechanisms (11, 12, 13) respectively mounted on each of the three conduits, the circulation mechanism associated with each of these conduits selectively taking take two positions:
  an injection position in which the liquid circulates in the conduit through the circulation mechanism from the liquid injection system to the arterial network and in which the liquid does not circulate in the conduit through the circulation mechanism from the arterial network to the liquid injection system,
  an evacuation position in which the liquid circulates in the conduit through the circulation mechanism from the arterial network to the liquid injection system and in which the liquid does not circulate in the conduit through the circulation mechanism from the liquid injection system to the arterial network, a selector selecting at least two liquid injection modes from among:
  a pressurised mode in which the three circulation mechanisms are placed in the injection position,
  a circulation mode in which one or two of the circulation mechanisms are placed in the injection position and in which the other circulation mechanism(s) are placed in the evacuation position.

18. The medico-surgical simulation method of claim 17, wherein the vascularisation step further comprises a measurement step in which at least one parameter representative of a flow of liquid in the cardiovascular circuit is measured by a liquid measurement system (151, 152, 153, 16), and
  wherein the ventilation step further comprises a measurement step in which at least one parameter representative of a flow of the gas in the respiratory circuit is measured by a gas measurement system (25).

* * * * *